United States Patent [19]

Lowry et al.

[11] Patent Number: 4,642,688
[45] Date of Patent: Feb. 10, 1987

[54] METHOD AND APPARATUS FOR CREATING ENCRYPTED AND DECRYPTED TELEVISION SIGNALS

[75] Inventors: John D. Lowry, Toronto; Keith Lucas, Oak Ridges, both of Canada

[73] Assignee: Scientific Atlanta, Inc., Atlanta, Ga.

[21] Appl. No.: 736,301

[22] Filed: May 21, 1985

Related U.S. Application Data

[63] Continuation-in-part of Ser. No. 507,565, Jun. 24, 1983.

[51] Int. Cl.⁴ .................... H04N 7/167; H04N 11/06
[52] U.S. Cl. ...................................... 380/11; 358/12; 380/20
[58] Field of Search .............. 358/120, 123, 12, 114, 358/119

[56] References Cited

U.S. PATENT DOCUMENTS

| | | | |
|---|---|---|---|
| 2,547,598 | 4/1951 | Roschke | 358/124 |
| 2,673,237 | 3/1954 | Reeves | 358/120 |
| 2,677,719 | 5/1954 | Reeves | 358/119 |
| 2,961,481 | 11/1960 | Hammond, Jr. et al. | 358/119 X |
| 2,972,008 | 2/1961 | Ridenour et al. | 358/123 |
| 3,735,027 | 5/1973 | Corwin et al. | 358/114 |
| 4,070,693 | 1/1978 | Shutterly | 358/123 |
| 4,319,273 | 3/1982 | Nossem | 358/120 |
| 4,325,079 | 4/1982 | Little | 358/120 |
| 4,330,794 | 5/1982 | Sherwood | 358/120 |
| 4,335,393 | 6/1982 | Pearson | 358/4 |
| 4,338,628 | 7/1982 | Payne et al. | 358/120 |
| 4,390,898 | 6/1983 | Bond et al. | 358/119 |
| 4,396,946 | 8/1983 | Bond | 358/119 |
| 4,405,942 | 9/1983 | Block et al. | 358/119 |
| 4,466,017 | 8/1984 | Banker | 358/120 |

FOREIGN PATENT DOCUMENTS

| | | |
|---|---|---|
| 642144 | 6/1962 | Canada .................. 358/119 |
| 750074 | 1/1967 | Canada . |
| 0004083 | 10/1979 | European Pat. Off. . |
| 0021938 | 1/1981 | European Pat. Off. . |
| 0027572 | 4/1981 | European Pat. Off. . |
| 82/01109 | 4/1982 | World Int. Prop. O. . |
| 83/03942 | 11/1983 | World Int. Prop. O. . |
| 1252332 | 11/1971 | United Kingdom . |
| 1356193 | 6/1974 | United Kingdom . |
| 1356970 | 6/1974 | United Kingdom . |
| 1382558 | 2/1975 | United Kingdom . |
| 1479717 | 7/1977 | United Kingdom . |
| 1503051 | 3/1978 | United Kingdom . |
| 1521213 | 8/1978 | United Kingdom . |
| 1528273 | 10/1978 | United Kingdom . |
| 1557741 | 12/1979 | United Kingdom . |
| 1602119 | 11/1981 | United Kingdom . |

OTHER PUBLICATIONS

Den Toonder et al, United Kingdom Patent Application No. 2,078,051, Dec. 23, '81.
Den Toonder et al, United Kingdom Patent Application No. 2,077,547, Dec. 16, '81.
W. Cheung, United Kingdom Patent Application No. 2,042,846, Dec. 24, '80.
Fondse et al, United Kingdom Patent Application No. 2,038,137, Jul. 16, '80.

Primary Examiner—Stephen C. Buczinski
Assistant Examiner—Linda J. Wallace
Attorney, Agent, or Firm—Banner, Birch, McKie & Beckett

[57] ABSTRACT

A method and apparatus for creating a television signal and encrypting or decrypting the signal at the same time. Luminance and chrominance information are received by the apparatus and stored in separate television scan line stores. The stored liminance and chrominance information is read out from their respective stores at a frequency corresponding to a desired format or standard to create the television signal. The signal may be simultaneously encrypted or decrypted by delaying the time at which the luminance and/or chrominance information is read out in accordance with an encryption or decryption key.

24 Claims, 19 Drawing Figures

METHOD AND APPARATUS FOR CREATING ENCRYPTED AND DECRYPTED TELEVISION SIGNALS

REFERENCE TO PRIOR APPLICATION

This application is a continuation-in-part of applicants' application Ser. No. 507,565 filed June 24, 1983.

BACKGROUND OF THE INVENTION

The present invention relates to the field of television signal transmission and, more particularly, is directed to a method and apparatus for creating a television signal and encrypting or decrypting the signal at the same time.

Figure 1:
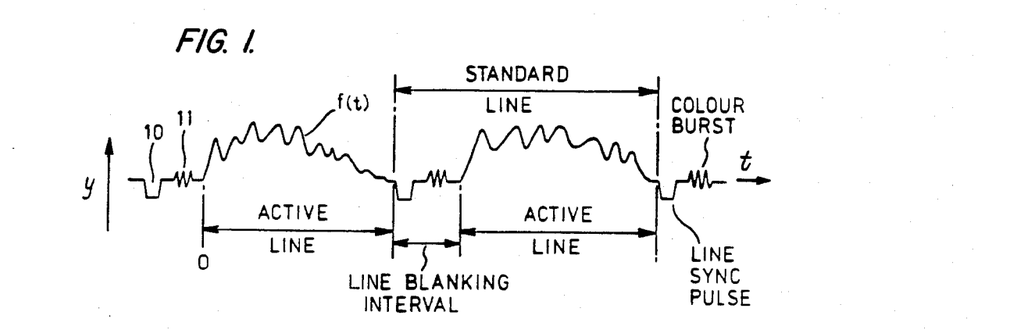
FIG. 1 shows a standard NTSC television signal.

Television signals are produced and displayed as a result of a line scanning process. The picture information is scanned using a progressive series of horizontal lines which are transmitted sequentially in time. The transmitted signal is a continuous analogue of the brightness intensity corresponding to each point of the line. Such a signal is shown in FIG. 1 from which it may be seen that in a series of standard lines, any two adjacent active line periods (periods during which video information is transmitted) are separated by a period in which no video information is transmitted. This latter period is known as the line blanking interval and is introduced to allow the scanning device in the receiver to reset to the line-start position.

In typically color television signals, the active line period includes one signal which simultaneously represents the instantaneous values of three independent color components. The method by which the three color components are coded into one signal is standardized throughout North America, Canada and Japan. This method is known as the NTSC standard. Alternative standards known as PAL and SECAM have been adopted in other countries but these standards have the same basic format as the NTSC standard, including a line-blanking interval and an active line period in each scan line.

Other types of analogue video signals which are particularly adapted to transmission by satellite and cable, and which lead to improved picture quality in comparison with existing standards, are presently being studied. These signals are based on a time multiplex of the three independent color components during the active line period of the scan line. Instead of coding the three components into one signal using the NTSC, PAL or SECAM standard, the components are sent sequentially using a time-compression technique. One version of this type of signal is know as MAC (Multiplexed Analogue Components). Signals generated by a time comparison technique also adhere to the same basic format as the NTSC, PAL and SECAM standards, including the presence of a line-blanking interval and an active line period in each scan line. It should be noted that when a MAC signal is employed, digital data may also be transmitted during the line-blanking interval as shown by the dotted lines in FIGS. 2a and 2c.

Figure 10:
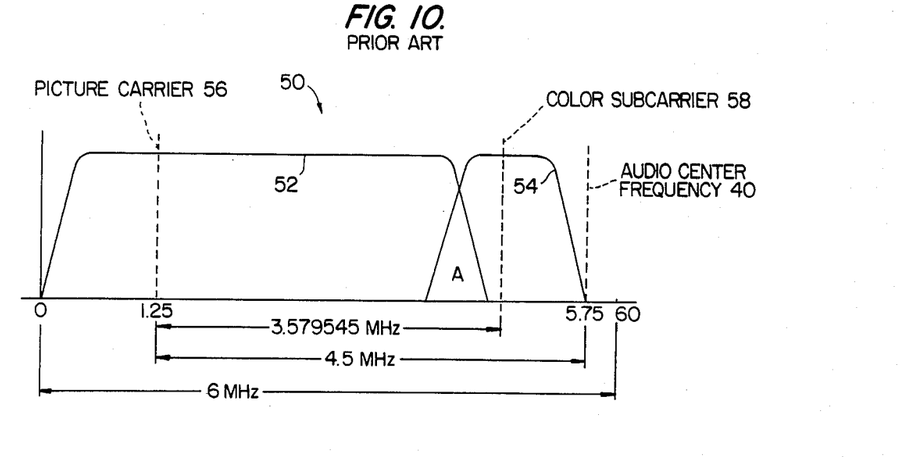
FIG. 10 is an amplitude-vs.-frequency diagram illustrating in simplified form a typical NTSC color television signal.

Color video signals broadcast under the NTSC standard require that picture information be separated into two components: luminance, or brightness, and chrominance, or color. FIG. 10 is an amplitude-vs.-frequency diagram illustrating, in simplied form, a typical NTSC composite color television signal 50 comprising a luminance signal 52 and a chrominance signal 54. (A composite television signal is one in which chrominance information is carried on a subcarrier.) The signal occupies a nominal bandwidth of 6 MHz with the picture carrier 56 being 1.25 MHz above the lower end of the band. Luminance information is modulated directly onto picture carrier 56, while chrominance information is modulated onto color subcarrier 58 which is in turn used to modulate picture carrier 56. Color subcarrier 58 has a frequency of 3.579545 MHz, a standard established by the NTSC. (Audio information is carried on another subcarrier 40 lying near the upper edge of the band.)

The region labeled A in FIG. 10 is of particular importance for it represents overlap between the luminance 52 and chrominance 54 signals. Since separation of luminance and chrominance is accomplished by filtering a frequency-division multiplexed signal, overlaps such as A between the two signals lead to several problems. If, upon reception, complete separation between luminance and chrominance is desired, the necessary filtering will cause the loss of some of the information in both signals. On the other hand, if no loss of information can be tolerated, then one must accept interference between the luminance and chrominance signals. Moreover, since the various parts of the NTSC television signals are transmitted at different frequencies, phase shifts occurring during transmission will affect them differently, causing the signal to deteriorate. Also, the available color information is severely limited by the small color bandwidth permitted.

Figure 11:
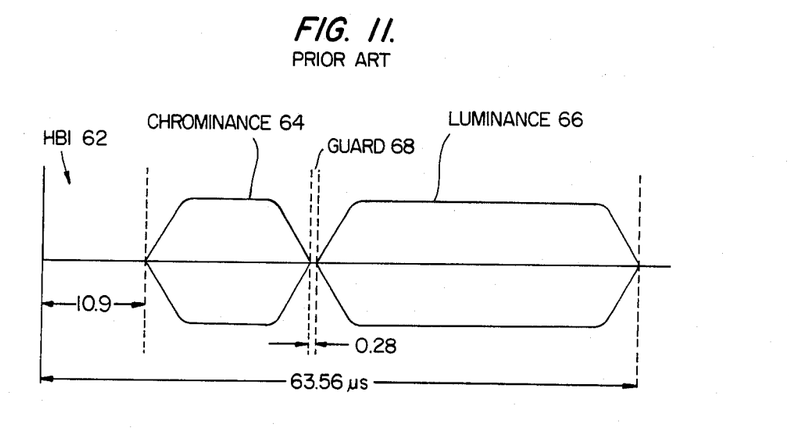
FIG. 11 is an amplitude-vs.-time diagram of a single video line of a typical MAC color television signal.

As discussed in commonly assigned pending application Ser. No. 652,926 filed Sept. 21, 1984, and herein incorporated by reference, the above-mentioned MAC standard was developed to overcome the problems associated with the NTSC standard. A MAC color television signal is illustrated in FIG. 11, which is an amplitude-vs.-time diagram of a single video line of 63.56 $\mu$s duration. The first 10.9 $\mu$s is in the horizontal blanking interval (HPI) 62, in which no picture information is transmitted. Following HBI 62 are chrominance signal 64 and luminance signal 66, either of which may be time-compressed. Between chrominance signal 64 and luminance signal 66 is a 0.28 $\mu$s guard band 68, to assist in preventing interference between the two signals.

The MAC color television signal of FIG. 11 is obtained by generating conventional luminance and chrominance signals (as would be done to obtain a conventional NTSC or other composite color television signal) and then sampling and storing them separately. Luminance is sampled at a luminance sampling frequency and stored in a luminance store, while chrominance is sampled at a chrominance sampling frequency and stored in a chrominance store. The luminance or chrominance samples may then be compressed in time by writing them into the store at their individual sampling frequency and reading them from the store at a higher frequency. A multiplexer selects either the luminance store or the chrominance store, at the appropriate time during the active line period, for reading, thus creating the MAC signal of FIG. 11. If desired, audio samples may be transmitted during the HBI; these are multiplexed (and may be compressed) in the same manner as the video samples. The sample rate at which all samples occur in the multiplexed MAC signal is called the MAC sampling frequency.

Although the MAC format of FIG. 11 overcomes the problems of the composite television signal of FIGS. 1 and 10, there also exists in the prior art a need for secure encryption of video signals, such that only designated users may decrypt and display the information. In typical encryption systems, one or more parameters of the signal to be encrypted are modified according to a pattern which is determined at the transmitter. The pattern generally is a member of a large class of similar patterns, such that discovery of the pattern through exhaustive search is extremely unlikely. A precise description of the pattern used for encryption is delivered to designated receivers which then are able to recover the original information. The description of the pattern is known in the art as the "encryption key" and the process of informing designated users of the encrytion key is known as "key distribution."

With reference to FIG. 1, various encryption techniques known in the art will be described. As shown in FIG. 1, the video signal during the active line period may be represented by:

$$y = f(t)$$

where
y = amplitude (voltage) and
t = time

Knowledge of both the signal's amplitude (y) and the time at which it occurs (t) is necessary for accurate reconstruction of the video signal in a line scan system.

Encryption techniques may be classified as follows:
(1) Those which modify the amplitude (y) of the transmitted signal according to a prescribed pattern.

$$y' = g(f),$$

where
$f = f(t)$

Examples of this technique include amplitude reversal of randomly chosen lines:

$$y' = g(f) = -f$$

(2) Those which modify the time at which the signal is transmitted through the channel:

$$y' = f(t')$$

Examples of this technique include the reordering of television lines according to a prescribed pattern:

$$y' = f(t-d)$$

(3) Those which modify both amplitude and transmission time.

It has been found that encryption techniques from the first category (variation of amplitude) cause distortion when the channel through which the signal is to be passed is non-linear. In this case, an amplitude (y) will be represented in the scrambled channel by various amplitudes according to the scrambling function in use at that instant. Channel non-linearity, therefore, causes imperfect reconstruction of the video information at the receiver. Since amplitude non-linearity is very common, it has been found that an optimum encryption algorithm should be selected from the second category, and, in particular, from the subset:

$$y' = f(t-d)$$

where d is constant during each standard line. In this case, the channel is subjected to an undistorted signal and only the time at which the signal occurs is scrambled. Since almost all channels are essentially 'time invariant,' this technique introduces little distortion. This system is known as time-base scrambling.

An obvious method of time-base scrambling which has been used, is to reorder the television lines within the picture. This method, which results when d in the previous equation is an integral number of line periods, is complex, expensive and difficult to implement because recovery of the picture in the receiver demands storage of many television lines.

SUMMARY OF THE INVENTION

It is, therefore, the overall object of the present invention to provide a method and apparatus for creating a television signal while at the same time encrypting and decrypting the signal.

It is a specific object of the present invention to provide a method and apparatus for time-base scrambling of television signals which is relatively simple and which can be readily implemented.

It is another specific object of the present invention to provide a method and apparatus for time-base scrambling of television signals which can be implemented at low cost while at the same time being reliable in operation.

It is a still further specific object of the present invention to provide a method and apparatus for time-base scrambling of television signals which requires storage of only a very small number of television lines in the receiver.

It is another specific object of the present invention to provide a method and apparatus for creating an encrypted MAC standard television signal for transmission and for creating a decrypted NTSC standard television signal for display on a television receiver.

These and other objects of the present invention are achieved by using the same apparatus to create a television signal and to encrypt and decrypt the signal at the same time. In accordance with the present invention, a MAC standard television signal may be created and encrypted for transmission to a remote receiver. At the receiver end, the MAC signal may be used to create a decrypted signal, as for example an NTSC signal, for display on a television receiver. The MAC signal is created at the transmitter end by sampling and storing the luminance and chrominance signals separately. Luminance is sampled at a luminance sampling frequency and stored in a luminance store while chrominance is sampled at a chrominance sampling frequency and stored in a chrominance store. The luminance and chrominance samples are compressed in time by writing them into the store at their individual sampling frequency and reading them from the store at a higher frequency. A multiplexer selects either the luminance store or the chrominance store, at the appropriate time during the active period of the video scan line, for reading, thus creating the MAC signal. The signal may be encrypted by varying the starting time at which the luminance and/or chrominance signals are read out from their respective stores in accordance with an encryption key.

At the remote or receiver end, a decrypted signal, e.g., an NTSC signal, may be created for display on a television receiver using the same method and apparatus as used to create the encrypted signal at the television transmitter end. This is accomplished by also storing the incoming luminance and chrominance signals in individual stores. The signals are read out from the stores at a frequency corresponding to the desired format, i.e., the NTSC standard. The signal is decrypted by varying the starting time at which the luminance and/or chrominance signals are read out from their respective stores in accordance with a decryption key.

Thus, the method and apparatus of the present invention may be used for creating an encrypted television signal for transmission to a remote receiver and for creating a decrypted signal at the receiver for display. Accordingly, a television broadcast system which embodies the present invention uses fewer component parts, is simplier in construction, more reliable in operation and is lower in cost.

DETAILED DESCRIPTION OF THE PREFERRED EMBODIMENT

Figure 2A:
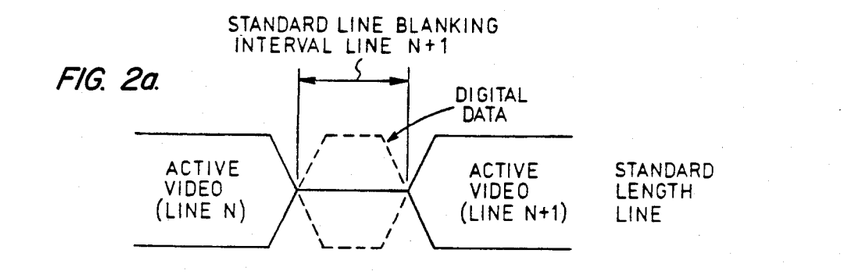
FIGS. 2a, 2b and 2c illustrate the encryption technique employed in the present invention.
Figure 2B:
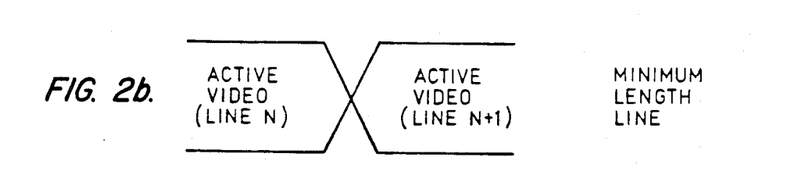
Figure 2C:
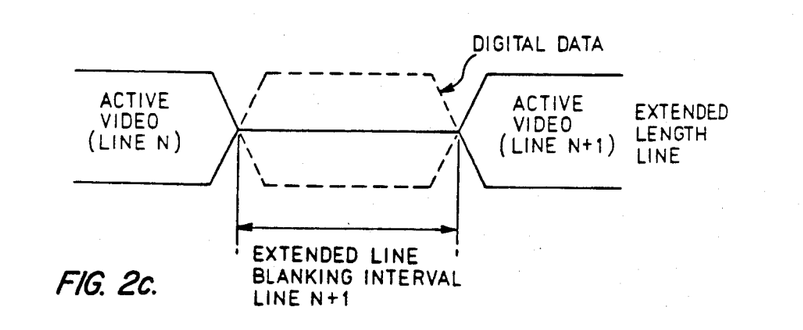

The encryption and decryption method of the present invention is based on the derivation and use of a variable scan line period as shown in FIGS. 2a–2c. Referring to FIG. 2a, portions of the active video components of lines N and N+1 are shown along with the line-blanking interval of line N+1. The line shown in FIG. 2a is of standard length and thus includes a standard line-blanking interval. As discussed previously, and as shown in dotted outline in FIG. 2a, instead of there being a line-blanking interval, there may be a period of standard length for transmission of digital data.

A line of minimum length is shown in FIG. 2b and is obtained by virtually eliminating the standard line-blanking interval or the period of digital data transmission.

A line of extended length is shown in FIG. 2c and is obtained by increasing the standard line-blanking interval or the period of digital data transmission shown in FIG. 2a, the dotted outline in FIG. 2c also indicating digital data.

An extended length line of the type shown in FIG. 2c can be derived with simple hardware in the case where the line-blanking interval is double the line-blanking interval of FIG. 2a. In fact, the extended length line of FIG. 2c is such a line and has twice the line blanking interval of the standard line of FIG. 2a.

Encryption is achieved according to the present invention by varying the line-blanking intervals of some of the lines to derive minimum and extended length lines. The transmitted television signal is then composed of lines of all three different lengths in accordance with an encryption key.

It will be appreciated that over some specified period of time it is necessary for the average line length to be equal to the length of a standard line, i.e., that the long and short lines must cancel or balance each other out. This period is not critical. It may be one field, for example, or one frame, or it may be even a longer period. The longer this period is, however, the longer it will take for the receiver to lock in on the signal.

While FIGS. 2a–2c illustrate an embodiment of the invention where the line-blanking interval is standard, zero and two times standard, line-blanking intervals between zero and standard can be employed as well as line-blanking intervals more than twice standard and/or between one and two times standard. There may also be a number of different line-blanking intervals greater than standard. Generally speaking, however, employing a standard and more than two other line blanking intervals can be done only at the expense of more sophisticated hardware.

In another embodiment of the invention, no standard length line is employed, i.e., the line-blanking intervals of all lines are lengthened or shortened. Thus, in the practice of the present invention a television signal is modified in accordance with an encryption key to produce a signal in which all active video lines are transmitted unchanged except for a time delay equal to the accumulated variance in the line-blanking periods. More specifically, and as determined by the encryption key, some lines may be left with unchanged line-blanking intervals, the line-blanking intervals of other lines are increased and the line-blanking intervals of still other lines are decreased. The encrypted television signal is composed of all of these lines and is what is transmitted, the encryption key indicating which lines are standard lines, which lines are long lines and which lines are short lines to enable decryption of the received signal.

One additional condition is require to ensure a low-cost receiver. This condition is that the accumulated change of the line-blanking periods at any given time should remain within the range of from 0–1 line. With this constraint, the lines which arrive at the receiver do not require more than one line of delay before they are used in reconstructing the original signal, i.e., the signal prior to encryption. It is to be understood clearly, however, that this is not a limitation of the present invention. If the accumulated change in the line-blanking periods at any given time will be more than one line, all that is required is to ensure that apparatus capable of storing the accumulated change is available. This requirement simply introduces greater cost and complexity.

Because certain of the line-blanking periods have been completely or partially removed, it is necessary to regenerate the blanking waveforms in the receiver. This can be achieved simply using electronic memories. More specifically, in the case of an NTSC signal, for example, regeneration of the line-blanking intervals will require regeneration of the line synchronizing signals and the color burst signals. This can be done using prior art techniques, however, and is not a part of the present invention. Thus, once the decryption key, which is the same as the encryption key, has been employed to restore the active video components to their proper time relationship with respect to each other, sync and color burst signals correctly timed with respect to the video signals can be added readily and by known means.

In the case where digital data is present during what would otherwise appear to be a line-blanking interval, it might appear from FIG. 2b that the digital data would be lost by the practice of this invention. The data is not lost, however, but rather is transmitted during longer than standard digital data periods, as shown in FIG. 2c, for example.

The encryption/decryption technique described herein can be implemented in a large number of ways using known techniques, equipment and components. Thus, referring to FIG. 3, for example, the television signal produced by TV camera 12 is supplied to an optional analogue to digital converter (ADC) 13, the digital output of which is supplied to a line storage device 14. The output of line storage device 14 is supplied to an optional digital to analogue converter (DAC) 15 whose output, which is an encrypted television signal in analogue form, is supplied to a transmitter 16 for broadcast to a satellite 17, for example. An encryption key for encrypting the television signal in line storage device 14 is supplied to encoding and timing networks which vary the line-blanking intervals of the television signal.

Figure 3:
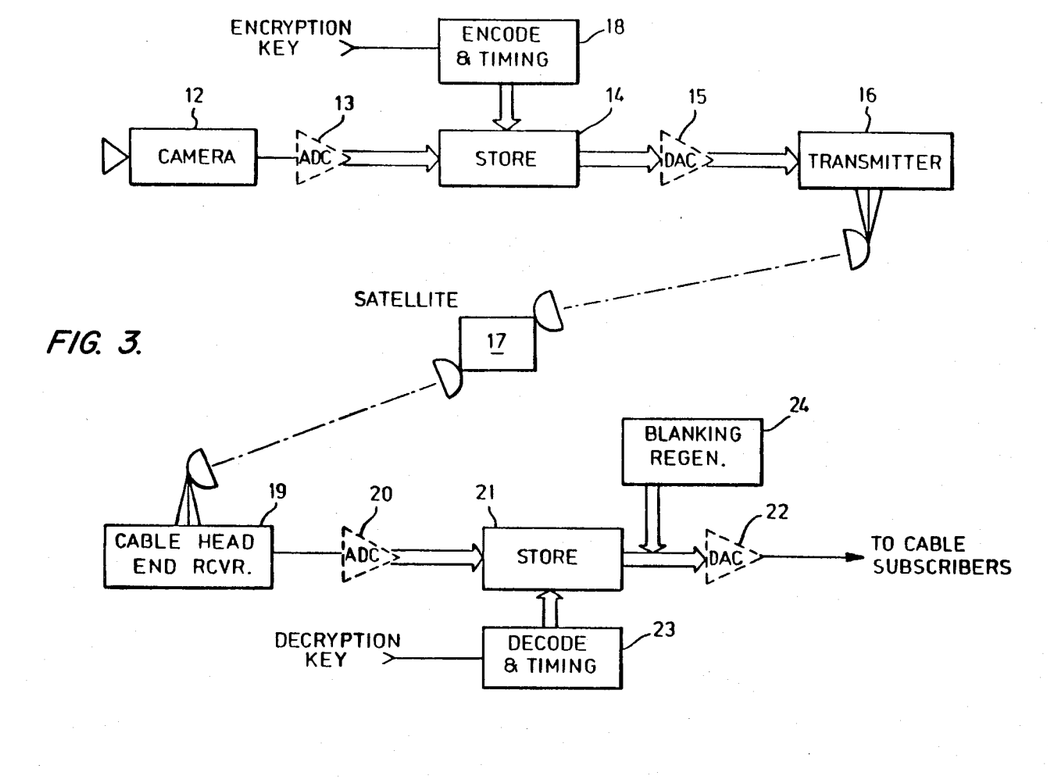
FIG. 3 shows one form of an encryption/decryption system which may be used with the present invention.

The encrypted signal is received by a cable head end receiver 19 and is supplied to an optional ADC 20 whose digital output is supplied to a line storage device 21. The output of line storage device 21 is supplied to an optional DAC 22 whose output, which is a decrypted TV signal the same in all respects as that derived at the output of camera 12, is supplied via cable to cable subscribers. A decryption key, which is the same as the encryption key, for decrypting the television signal in line storage device 21 is supplied to decoding and timing networks 23 which restores the shortened and extended link-blanking intervals to the standard length shown in FIG. 2a.

In the case where the TV signal is an NTSC signal, for example, it may be necessary to restore line and field synchronizing signals and color burst signals. This function is performed by blanking interval regenerating network 24.

The TV signal may be processed in either analogue or digital form. The nature of line storage devices 14 and 21 will depend upon the format of the signal. Thus, if the TV signal is in analogue form, line storage devices 14 and 21 may be so-called bucket-brigade devices, while, if the TV signal is in digital form, line storage devices 14 and 21 may be shift registers or may be RAM with at least one line memory capacity or CCD storage devices.

Figure 8:
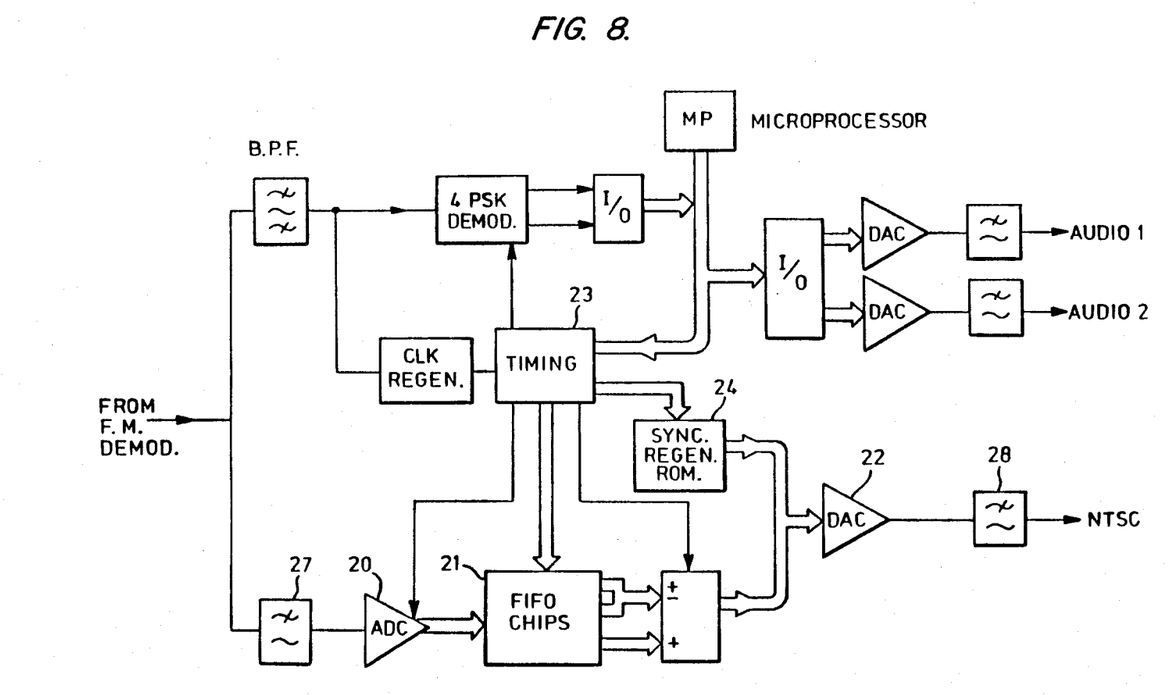
FIG. 8 shows a decryption system embodying an aspect of the invention and surrounding equipment.

FIG. 8 shows a decryption system embodying the present invention in somewhat greater detail.

Figure 9:
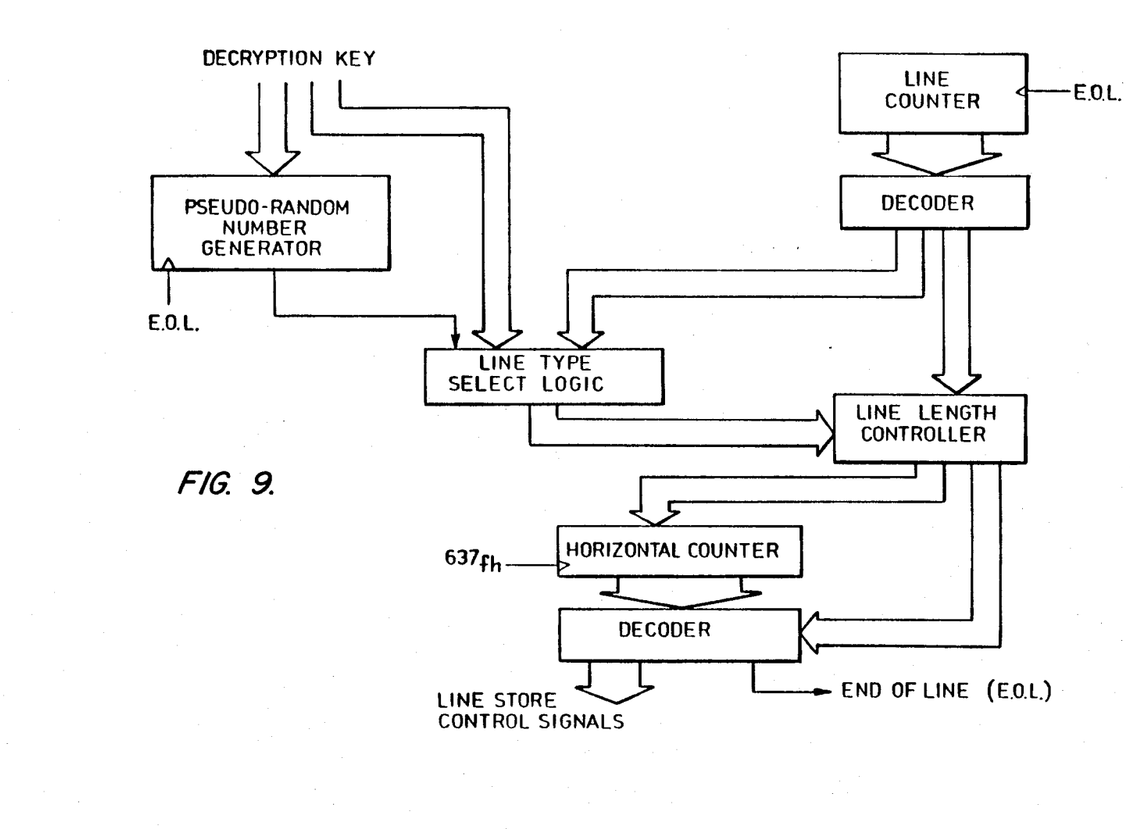
FIG. 9 illustrates apparatus that may be employed for the encryption and decryption of video signals by a technique embodying the present invention.

FIG. 9 shows how the decryption (or encryption) key is used to vary the line lengths. The decryption key (which in the embodiment shown, is updated once a frame) is used as a starting vector for a pseudo-random number generator circuit. This circuit produces (for the NTSC standard) a sequence of 525 random numbers based on the decryption key. These random numbers then are combined with information derived from a counter, which is incremented once per line, in a line type selection circuit. This circuit selects the type of line (i.e., determines the length of the blanking interval) for the next line. This information is then fed to the line length controller which monitors the aggregate deviation in line lengths referenced to the start of the current frame and ensures that for this particular embodiment the following two conditions are met:

1. The aggregate deviation never exceeds one full video line (63.56μ sec for an NTSC signal);
2. The aggregate deviation at the end of the frame is zero.

The line controller then provides information to the horizontal counter and its associated decoder which enables this counter/decoder to produce the correct line store control signals for the current line.

Figure 12:
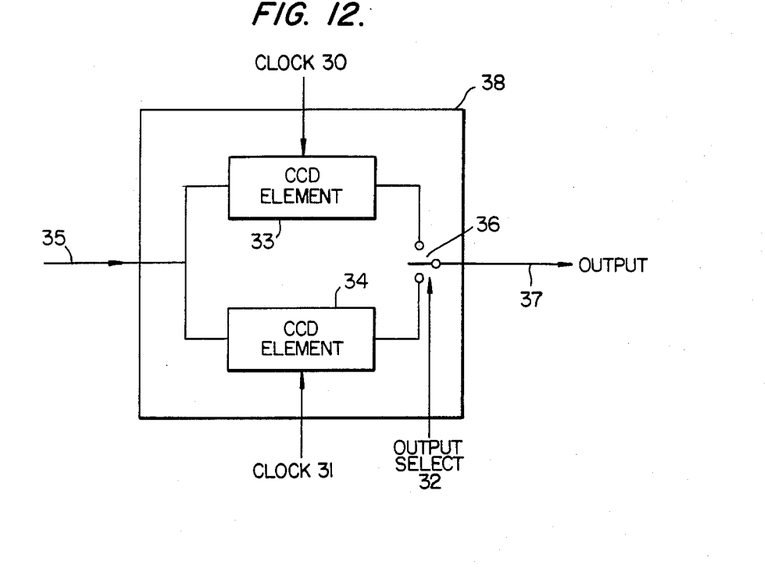
FIG. 12 is a block diagram of a line store which may be used to compress or decompress television scan lines in accordance with the present invention.

As pointed out above, use of the MAC standard for transmission of television signals eliminates many of the problems associated with the NTSC standard. FIG. 12 is a block diagram of a line store which may be used to compress or decompress luminance and chrominance signals to create a MAC standard television signal. The store comprises a pair of memory elements 33 and 34 coupled to a common input 35 which recieves either luminance or chrominance, i.e., color different signals. Memory elements 33 and 34 may be selected from among a number of memory elements known in the art and are shown in FIG. 12 as being CCD memory elements. Memory elements 33 and 34 are coupled to respective clock signals 30 and 31 and to selector switch 36. Switch 36 is an electronic switch or multiplexer well known in the art and which has a double-pole-single-throw (DPST) function. Each respective output line of memory elements 33 and 34 are coupled to switch 36 and selectively passed to output line 37 as controlled by output select signal 32.

Figure 13:
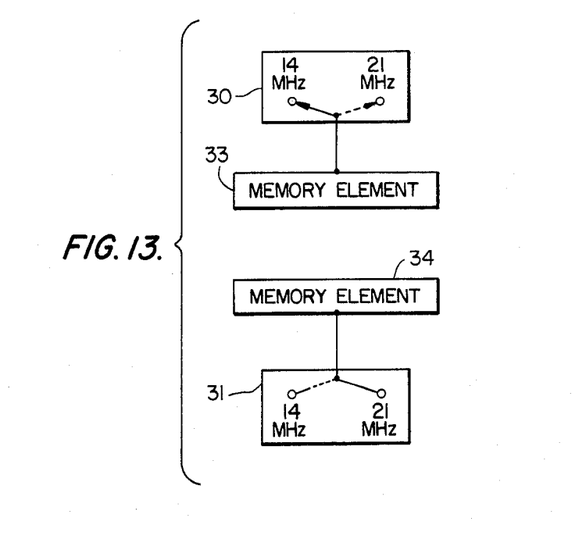
FIG. 13 is a block diagram of the clock signals used to control the line store shown in FIG. 12.

Though the line store of FIG. 12 may be used to both compress and decompress signals, the device is described hereafter as performing compression. When a signal, as for example a luminance signal, arrises at input 35, clock 30 writes a predetermined number of luminance samples into memory element 33 at a predetermined incoming sampling frequency. It has been found that a suitable number of samples is 750 and that a suitable incoming sampling frequency is 14.32 MHz for a luminance signal in accordance with, for example, the NTSC standard. At the same time that memory element 33 is storing the incoming luminance signal, clock 31 is causing the contents of memory element 34 (luminance signals from the previous scan line) to be read onto output line 37 through switch 36 at a predetermined outgoing sampling frequency. It has been found that a suitable outgoing sampling frequency is 21.48 MHz. During the next scan line, the 750 luminance samples are written into memory element 34 by clock 31, operating at the incoming sampling frequency of 14.32 MHz. At the same time, the luminance samples stored in memory element 33 are read out to output line 37 by clock 30 at the outgoing sampling frequency of 21.48 MHz. A separate line store having a pair of memory elements is used to compress the color difference signals (i.e., chrominance signals) and operates in a similar manner. FIG. 13 is a block diagram of the clock signals used to control the operation of memory elements 33 and 34.

Figure 14:
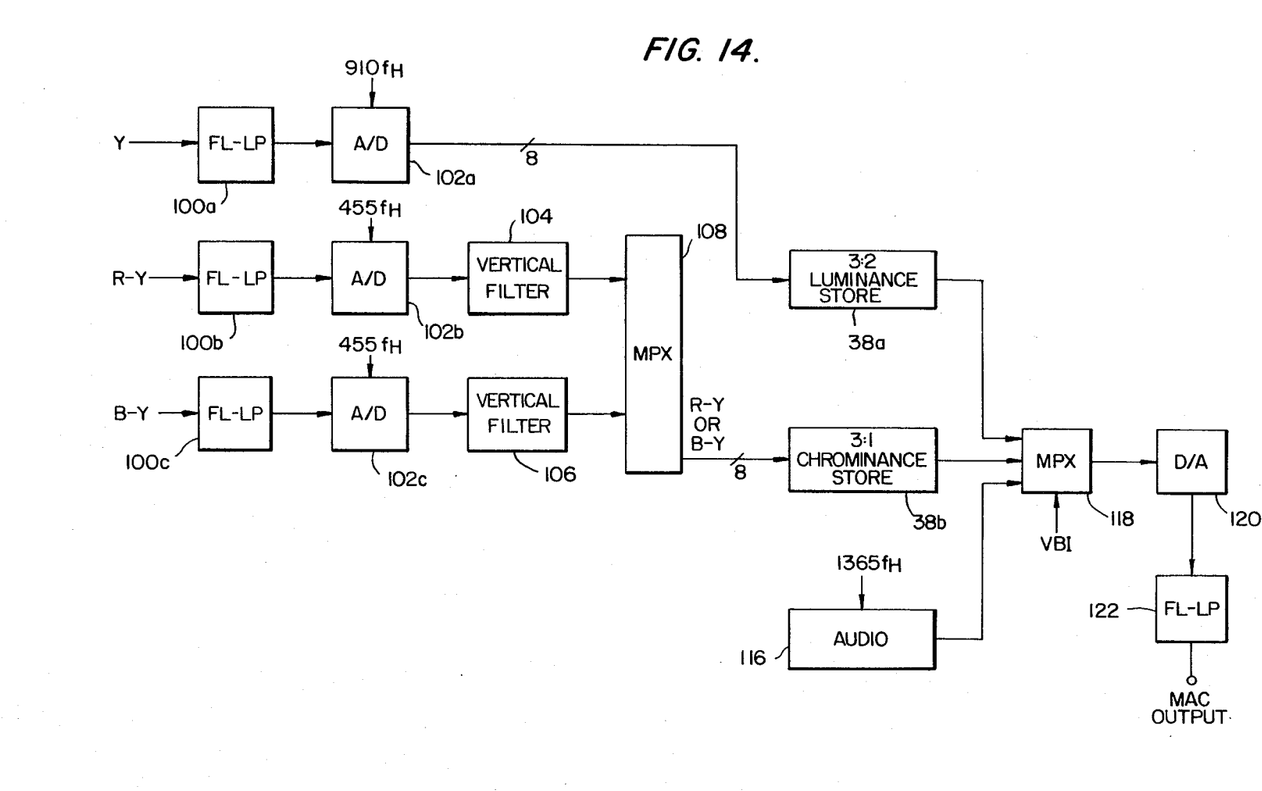
FIG. 14 is a block diagram of an encoder which may be used with the present invention.

FIG. 14 is a block diagram of an encoder which may be used with the present invention and includes the line store shown in FIG. 12 for storing and subsequently reading out the luminance and chrominance signals. As shown, three color television signals, luminance (Y) and two color difference signals (R−Y and B−Y) are delivered from a television signal source and are filtered, respectively, in low-pass filters 100a, 100b and 100c. The filtered signals are then sampled at the appropriate incoming sampling frequency in A/D converters 102a, 102b, and 102c.

Vertical filters 104 and 106 provide vertical interpolation of the digital color difference signals R−Y and B−Y, respectively, after which these signals are selected alternately for transmission by multiplexer 108. Only one of the two color difference signals need be sent as chrominance in each line in order to create a MAC television signal.

The digital luminance and chrominance signals are next compressed as described above. Luminance data are written into and read from luminance store 38a. Chrominance data are written into and read from chrominance store 38b.

Multiplexer 118 receives four sets of signals, luminance, chrominance, audio, and synchronization. Multiplexer 118 then combines these signals by selecting them at the appropriate time for inclusion in the MAC video line. After multiplexing, the signals are reconverted to analog in D/A converter 120, filtered in low-passs filter 122, and output as a MAC color television signal.

Figure 15:
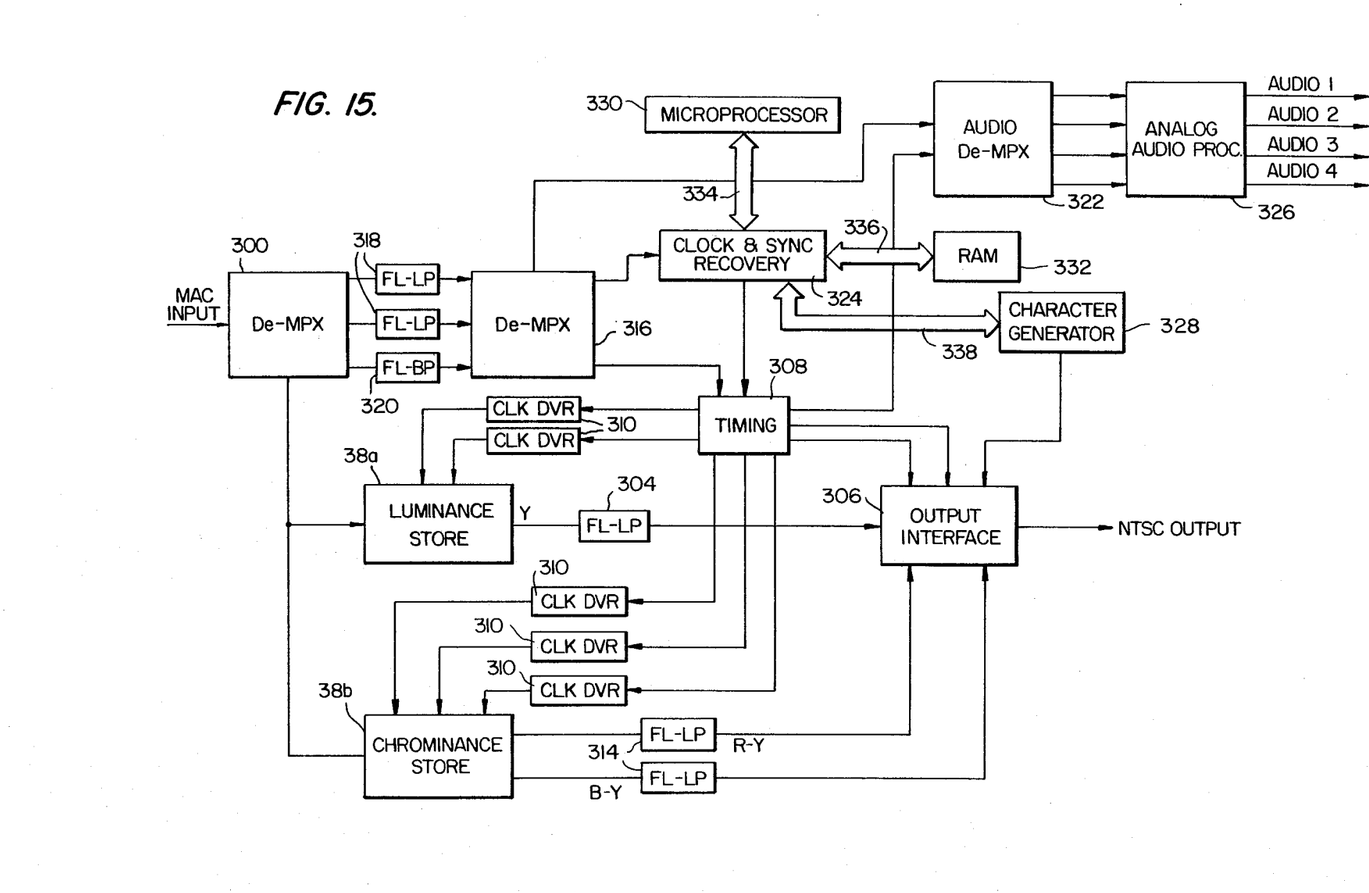
FIG. 15 is a block diagram of a decoder which may be used with the present invention.

FIG. 15 is a block diagram of a decoder which may be used with the present invention and also includes the line stores shown in FIG. 12. The incoming television signal first enters the demultiplexer 300, which separates from it the luminance and chrominance signals as well as the audio and synchronization signals. The luminance signal is delivered to luminance store 38a where it is decompressed, and then to low-pass filter 304, where it is filtered. The analog luminance signal then goes to output interface 306. The sampling signals necessary to decompress luminance are produced in timing generator 308 and supplied to luminance store 38a by two clock drivers 310.

The chrominance signal from demultiplexer 300 is also decompressed in chrominance store 38b. Separate outputs are provided for the two color difference signals, which are filtered in two low-pass filters 314 and then supplied to output interface 306. The necessary sampling signals are supplied to chrominance store 38b from timing generator 308 through three clock drivers 310.

Signals not constituting luminance or chrominance are also separated from the incoming television signal by demultiplexer 300. Output interface 306 receives luminance from low-pass filter 304, chrominance from low-pass filters 314, and timing signals from timing generator 308. Its output is a standard NTSC color television signal.

In accordance with the present invention, the line store of FIG. 12 may also be used to encrypt the television signal at the transmitter end during the creation of a MAC signal and to decrypt the created signal at the receiver end for display on a television receiver. Thus, the line store of FIG. 12 may be used to replace stores 14 and 21 shown in FIG. 3 to create an encrypted signal with respect to store 14 and to create a decrypted signal with respect to store 21. As shown in FIG. 9, an encryption/decryption key is supplied to networks 23 which controls the generation of control signals for the line store. These signals include clock signals 30 and 31 and output select signal 32. Depending on the type of memories used for the memory elements within the line store, the control signals may also include read, write and memory refresh signals.

Figure 16A:
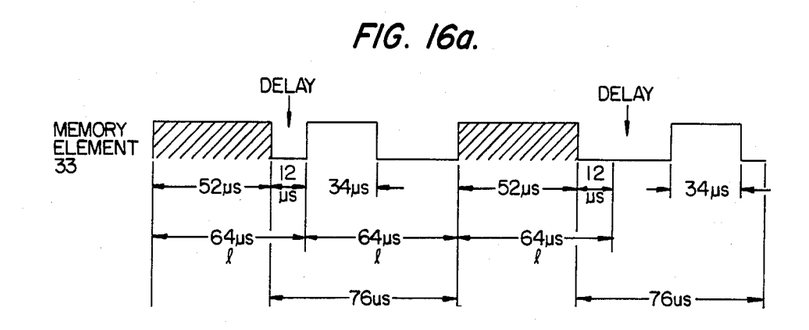
FIGS. 16a and 16b are diagrams illustrating the signals input to and output from the line store of FIG. 12.
Figure 16B:
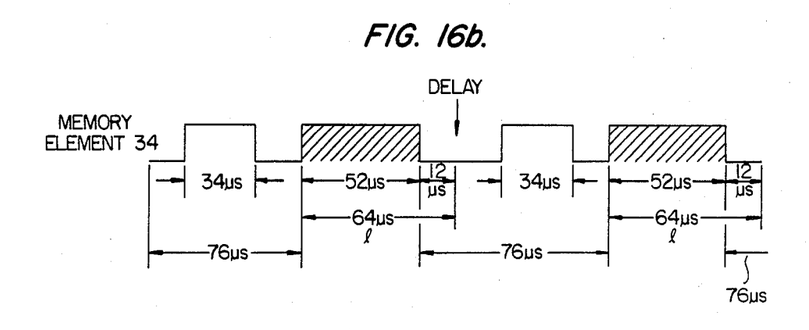

FIGS. 16a and 16b are diagrams illustrating the signals input and output from the line store of FIG. 12. To simplify the illustration from the line store of FIG. 12. To simplify the illustration and explanation, it is assumed that the line store is being used to compress a luminance signal, that the length of a standard scan line L is 64 μs and that the length of the horizontal blanking interval is 12 μs. Thus the length of the active or video portion of the scan line is 54 μs. FIG. 16a represents the operation of memory element 33 while FIG. 16b represents the operation of memory element 34.

As shown in FIG. 16a, 750 samples of luminance are taken at a sampling frequency of 14.32 MHz over 52 μs of the scan line and stored in memory element 33. After a delay in accordance with the encryption key, these samples ae read out at a sampling frequency of 21.48 MHz. The higher sampling frequency causes the samples to be read out much faster than they were read in, i.e., the incoming samples took 52 μs to read in but only 34 μs to read out. Therefore, compression of the incoming luminance singal is accomplished, thereby creating a luminance portion of MAC standard signals. Because readout of the samples is delayed in accordance with an encryption key, the MAC signal is also simultaneously encrypted. As can be seen from FIG. 16a, the length of the delay before reading out the stored samples can vary from 0 to 32 μs. A delay longer than 32 μs will not permit the samples to be completely read out prior to the arrival of a new scan line for storage.

Memory elements 33 and 34 operate in tandem, while one memory element is reading in luminance samples, the other memory element is reading out luminance samples from the previous scan line in MAC standard format. Thus, each memory element operates on alternate scan lines.

Likewise the line store of FIG. 12 could be used to decrypt the signal at the receiver while simultaneously decompressing the signal. In that event, the luminance signal will be read into the line store at 21.48 MHz and read out at 14.32 MHz to decompress the signal. The readout time can be controlled in accordance with a decryption key to simultaneously decrypt the signal.

Figure 4:
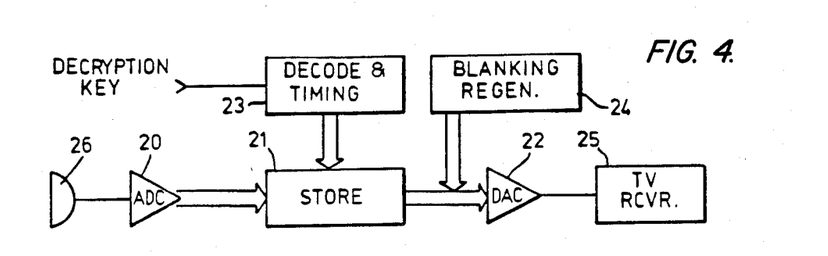
FIG. 4 shows an alternative system to that shown in FIG. 3.

It will be understood that cable distribution of the TV signal after decryption is not essential to this invention. FIG. 4 discloses an arrangement whereby encrypted signals are received by an antenna 26 at a user location, e.g., a home, decrypted at that location and supplied to a TV receiver 25 at the location.

Figure 6:
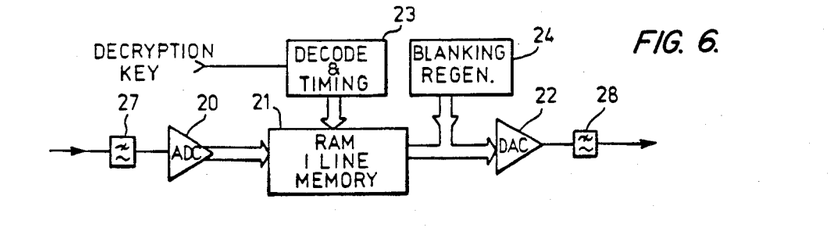
FIGS. 6 and 7 illustrate two different decryption systems which may be used with the present invention.

One form of a decryption system that can be used in practicing the present invention is shown in FIG. 6, line storage device 21 in this case being a one line RAM memory. Components 27 and 28 simply are low pass filters. With the system of FIG. 6, read and write cycles occur independently during each TV line.

Figure 7:
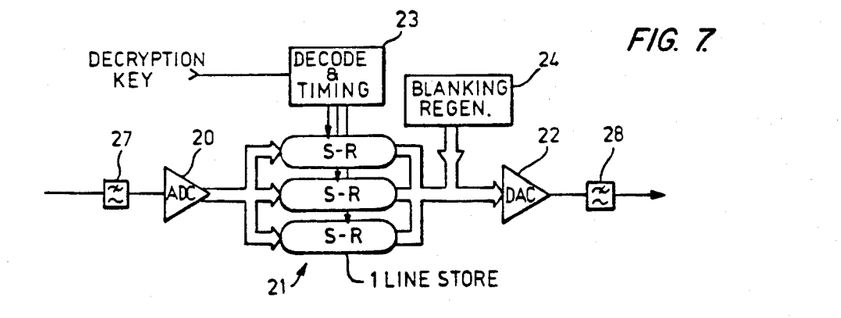

Another form of a decryption system that can be used in practicing the present invention is shown in FIG. 7, storage device 21 in this case being a number of shift registers. With the system of FIG. 7, the read-in and read-out cycles occur on different TV lines. The system of FIG. 7 also can be implemented using CCD technology.

Figure 5:
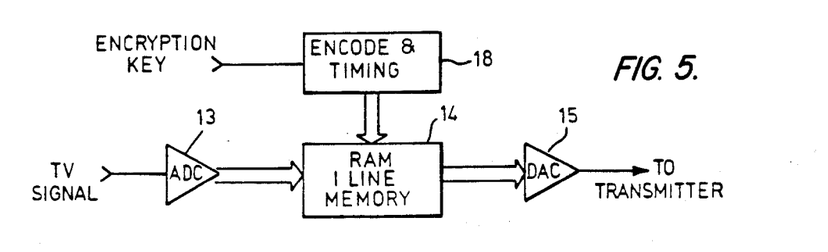
FIG. 5 illustrates another embodiment of an encryption system which may be used with the present invention.

An encryption system of a type paralleling the decryption system of FIG. 6 is shown in FIG. 5. Obviously an encryption system paralleling the decryption system of FIG. 7 also could be used and would be identical to that shown in FIG. 5 but with storage device 14 thereof being a plurality of shift registers connected as shown in FIG. 7.

While a preferred embodiment of the present invention has been described and illustrated herein, a person skilled in the art will appreciate that changes and modifications may be made therein without departing from the spirit and scope of this invention as defined in the appended claims.

We claim:

1. An apparatus for creating a MAC standard television signal and for encrypting said MAC signal at the time of its creation, said apparatus comprising:
    input means for receiving a scan line of luminance information, a scan line of color difference information and an encryption key;
    luminance storage means coupled to said input means for storing a scan line of said luminance information and subsequently reading out said stored line of luminance information to create said MAC standard signal, said luminance storage means including first and second memory means; and
    first and second clock signal means coupled to respective said first and second memory means, said first clock signal means being arranged to cause said first memory means to store a present scan line of said luminance information when said second clock signal means causes said second memory means to read out said stored scan line of luminance information, said second clock signal means being arranged to cause said second memory means to store a present scan line of said luminance information when said first clock signal means causes said first memory means to read out said stored scan line of luminance information, wherein said first and second clock signal means causes said first and second memory means to delay reading out said stored scan line of luminance information in accordance with said encryption key, said first and second clock signal means causes said respective first and second memory means to store a predetermined number of samples of said luminance information at a first predetermined sampling frequency and to read out sid stored scan line of luminance information at a second predetermined sampling frequency.

2. The apparatus of claim 1 wherein said predetermined number of samples is 750, said first predetermined sampling frequency is 14.32 MHz and said second predetermined sampling frequency is 21.48 MHz.

3. The apparatus of claim 1 wherein said first and second memory means comprises RAM memory.

4. The apparatus of claim 1 wherein said first and second memory means comprises a plurality of shift registers.

5. The apparatus of claim 1 wherein said first and second memory means comprises a plurality of CCD elements.

6. The apparatus of claim 1 further comprising color storage means coupled to said input means for storing a scan line of said color difference information and subsequently reading out said stored scan line of color difference information to create said MAC standard signal.

7. The apparatus of claim 6 wherein said color storage means includes first and second memory means coupled to said first and second clock signal means respectively, said first clock signal means being arranged to cause said first memory means of said color storage means to store a present scan line of said color difference information when said second clock signal means causes said second memory means of said color storage means to read out said stored scan line of color difference information, said second clock signal means being arranged to cause said second memory means of said color storage means to store a present scan line of said color difference information when said first clock signal means causes said first memory means of said color storage means to read out said stored scan line of color difference information, wherein said first and second clock signal means causes said first and second memory means of said color storage means to delay reading out said stored scan line of color difference information in accordance with said encryption key.

8. The apparatus of claim 7 wherein said first and second clock signal means causes said respective first and second memory means of said color storage means to store a predetermined number of samples of said color difference information at a first predetermined sampling frequency and to read out said stored scan line of color difference information at a second predetermined sampling frequency.

9. The apparatus of claim 8 wherein said predetermined number of samples is 750, said first predetermined sampling frequency is 14.32 MHz and said second predetermined sampling frequency is 21.48 MHz.

10. An apparatus for creating an NTSC standard television signal and for decrypting said NTSC signal at the time of its creation, said apparatus comprising:
    input means for receiving a scan line of luminance information, a scan line of color difference information and a decryption key;
    luminance storage means coupled to said input means for storing a scan line of said luminance information and subsequently reading out said stored scan line of luminance information to create said NTSC standard signal, said luminance storage means including first and second memory means; and
    first and second clock signal means coupled to respective said first and second memory means, said first clock signal means being arranged to cause said first memory means to store a present scan line of said luminance information when said second clock signal means causes said second memory means to read out said stored scan line of luminance information, said second clock signal means being arranged to cause said second memory means to store a present scan line of said luminance information when said first clock signal means causes said first memory means to read out said stored scan line of luminance information, wherein said first and second clock signal means causes said first and second memory means to delay reading out said stored scan line of luminance information in accordance with said decryption key, wherein said first and second clock signal means causes said respective first and second memory means to store a predetermined number of samples of said luminance information at a first predetermined sampling frequency and to read out said stored scan line luminance information at a second predetermined sampling frequency.

11. The apparatus of claim 10 wherein said predetermined number of samples is 750, said first predetermined sampling frequency is 21.48 MHz and said second predetermined sampling frequency is 14.32 MHz.

12. The apparatus of claim 10 wherein said first and second memory means comprises RAM memory.

13. The apparatus of claim 10 wherein said first and second memory means comprises a plurality of shift registers.

14. The apparatus of claim 10 wherein said first and second memory means comprises a plurality of CCD elements.

15. The apparatus of claim 10 further comprising color storage means coupled to said input means for storing a scan line of said color difference information and subsequently reading out said stored scan line of color difference information to create said NTSC standard signal.

16. The apparatus of claim 15 wherein said color storage means includes first and second memory means coupled to said first and second clock signal means respectively, said first clock signal means being arranged to cause said first memory means of said color storage means to store a present scan line of said color difference information when said second clock signal means causes said second memory means of said color storage means to read out said stored scan line of color difference information, said second clock signal means being arranged to cause said second memory means of said color storage means to store a present scan line of said color difference information when said first clock signal mean causes said first memory means of said color storage means to read out said stored scan line of color difference information, wherein said first and second clock signal means causes said first and second memory means of said color storage means to delay reading out said stored scan line of color difference information in accordance with said decryption key.

17. The apparatus of claim 16 wherein said first and second clock signal means causes said respective first and second memory means of said color storage means to store a predetermined number of samples frequency and to read out said stored scan line of color difference information at a second predetermined sampling frequency.

18. The apparatus of claim 17 wherein said predetermined number of samples is 750, said first predetermined sampling frequency is 21.48 MHz and said second sampling predetermined frequency is 14.32 MHz.

19. A method of simultaneously creating a MAC standard television signal by compressing luminance or color difference information and encrypting said MAC standard signal comprising the steps of:
storing a predetermined number of samples of a scan line of luminance information in one line store at a first predetermined sampling frequency; and
commencing reading out said stored scan line of luminance information from said one line store at a second predetermined sampling frequency after a time delay determined by an encryption key.

20. The method of claim 19 wherein said predetermined number of samples is 750, said first predetermined sampling frequency is 14.32 MHz, and said second predetermined sampling frequency is 21.48 MHz.

21. The method of claim 19 further comprising the steps of:
storing a predetermined number of samples of a scan line of color difference information in a separate line store at said first predetermined sampling frequency; and
commencing reading out said stored scan line of color difference information from said separate line store at said second predetermined sampling frequency after a time delay determined by said encryption key.

22. A method of simultaneously creating a decrypted NTSC standard television signal from an encrypted MAC signal by decompressing luminance or color difference information comprising the steps of:
storing a predetermined number of samples of a scan line of luminance information in one line store at a first predetermined sampling frequency; and
commencing reading out said stored scan line of luminance information from said one line store at a second predetermined sampling frequency after a time delay determined by a decryption key.

23. The method of claim 22 wherein said predetermined number of samples is 750, said first predetermined sampling frequency is 21.48 MHz, and said second predetermined sampling frequency is 14.32 MHz.

24. The method of claim 22 further comprising the steps of:
storing a predetermined number of samples of a scan line of color difference information in a separate line store at said first predetermined sampling frequency; and
commencing reading out said stored scan line of color difference information from said separate line store at said second predetermined sampling frequency after a time delay determined by said decryption key.

* * * * *